United States Patent [19]

Bishop

[11] 4,041,613
[45] Aug. 16, 1977

[54] HYDROSTATIC LEVEL INSTRUMENT

[76] Inventor: Dale F. Bishop, 8704 NW. 35th St., Coral Springs, Fla. 33065

[21] Appl. No.: 579,839

[22] Filed: May 22, 1975

[51] Int. Cl.² .............................................. G01C 5/04
[52] U.S. Cl. ................................................... 33/367
[58] Field of Search ................................. 33/367, 377

[56] References Cited

U.S. PATENT DOCUMENTS

| | | | |
|---|---|---|---|
| 547,864 | 10/1895 | Sherman | 33/367 |
| 909,529 | 1/1909 | Blair | 33/367 |
| 914,945 | 3/1909 | Gutwein | 33/367 |
| 1,231,162 | 6/1917 | Husby | 33/367 X |
| 2,335,893 | 12/1943 | Altenberg | 33/367 |
| 3,132,428 | 5/1964 | Haissig et al. | 33/367 |
| 3,849,898 | 11/1974 | Turloff | 33/367 |
| Re. 13,240 | 5/1911 | Gutwein | 33/367 |

FOREIGN PATENT DOCUMENTS

| | | | |
|---|---|---|---|
| 225,021 | 2/1958 | Australia | 33/377 |
| 272,304 | 12/1950 | Switzerland | 33/367 |

Primary Examiner—Charles E. Phillips
Attorney, Agent, or Firm—Harry N. Schofer

[57] ABSTRACT

An instrument for indicating levels above an irregular surface. A liquid reservoir of uniform internal cross section, having a scale on a transparent side wall indicating distances above and below a zero mark, is connected by a flexible duct with the bottom of an elongated transparent tube mounted on an elongated rod, the latter having a scale indicating distances above the bottom thereof. A pair of endless tapes is mounted for movement along the length of the tube. The tube is flat in cross section. The cross sectional area of the reservoir is larger than that of the tube, the ratio being an integer greater than one, and the ratio of the divisions on the scales on the reservoir and on one of the movable tapes is spaced in inverse ratio. The rod carries a movable guide which can be set to different positions to enable an operator to indicate positions at predetermined levels.

4 Claims, 5 Drawing Figures

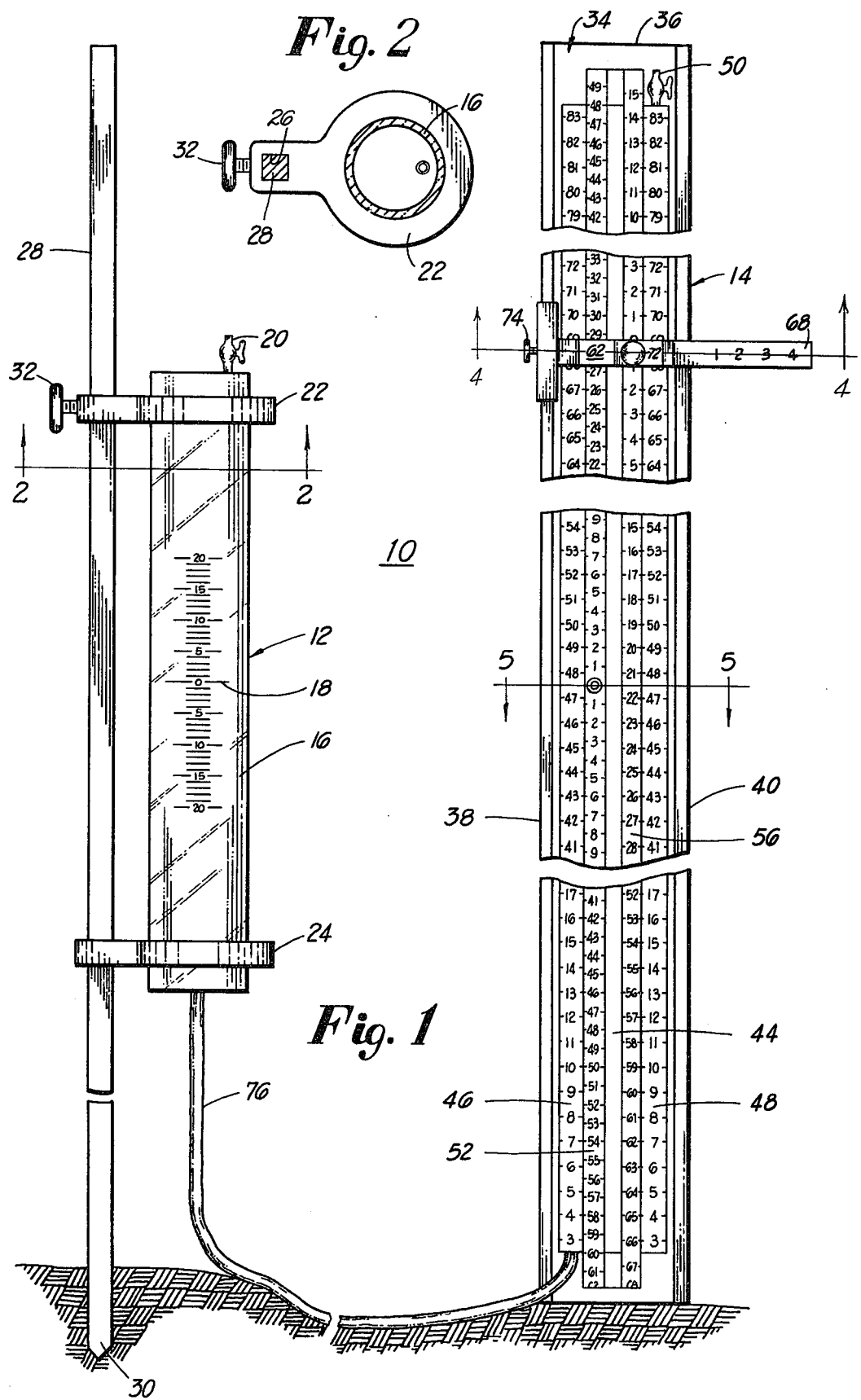

HYDROSTATIC LEVEL INSTRUMENT

BACKGROUND OF THE INVENTION

1. Field of the Invention

This invention relates to leveling instruments in general, and more particularly to a novel construction of a hydrostatic type of level particularly adapted in building and engineering projects for indicating and marking levels at spaced points above irregular ground surfaces.

2. Description of the Prior Art

Heretofore the prior art has employed the simple form of level comprising a sighting tube having a cross hair along the line of sight, mounted on a tripod, and using a bubble tube for determining a level position for the sighting tube. This requires the services of two men — one man to move, set up the instrument, and to operate the same, and one man to move and operate the calibrated measuring rod. In building construction, especially where a number of columns and other construction members are involved, it is frequently impossible to sight all of the stations where one desires to mark the levels with the instrument mounted at any single particular location, making it necessary for the instrument man to frequently move and to set up the instrument at a number of locations. Each time the instrument is moved, the operator must go through the same time consuming procedure of setting up the tripod on a comparatively level spot and to make sure that the sighting tube is level. This is time consuming not only for the instrument operator, but also for the rodman who must wait until the instrument is properly set up and sightings can be continued.

SUMMARY OF THE INVENTION

It is an object of this invention to provide a novel level instrument of the hydrostatic type which overcomes the above disadvantages, and which can be operated by a single person.

It is a further object to provide a novel level instrument of the hydrostatic type which does not require the presence of a comparatively level spot for mounting the instrument, but in which either of two elements of the instrument may be set up at any desired point on irregular surfaces.

It is a still further object to provide a novel level instrument of the hydrostatic type which can be used in any location regardless of obstacles or of the positioning of structural members, and which does not require a direct sighting line between a sighting tube and a calibrated rod as in conventional levels.

The attainment of the above objects, as well as other objects and advantages, is accomplished by a novel construction involving the provision of two basic elements — a liquid reservoir and a level instrument. The reservoir is generally elongated, and includes a transparent side wall having indications thereon marking divisions above and below a zero mark. The reservoir is adjustably mounted on a supporting member permitting the reservoir to be raised and lowered to any desired position.

The level instrument comprises an elongated rod on which is mounted an elongated transparent tube. The lower end of the tube is connected with the lower end of the reservoir by a flexible duct. The rod carries a scale indicating distances, in inches, centimeters, etc., from the bottom. A pair of endless tapes is provided, at least one of which is mounted for traversing over the length of the transparent tube. The tube is rectangular in cross section, and is smaller in cross section than the reservoir.

As used herein, the term "transparent" as applied to the walls of the reservoir and the elongated tube is used in its broader connotation to denote a translucent as well as a transparent material.

The internal cross sectional area of the reservoir is uniform throughout its length, and the ratio of this cross sectional area to the cross sectional area of the tube is an integer greater than one. One of the endless tapes which traverses the length of the transparent tube carries a scale with indications above and below a zero marking. The spacing of the divisions on the reservoir wall and on the movable tape traversing the transparent tube is in inverse ratio to their respective cross sections.

The other movable tape carries a scale indicating inches or centimeters above and below a zero mark thereon.

A movable guide is slidable along the length of the rod on a track carried by the rod, the guide including an arm extending transversely of the rod for the purpose of indicating and marking points on structural members, as will be explained in detail later in this specification.

BRIEF DESCRIPTION OF THE DRAWINGS

For a better understanding of the invention and its operation, reference is made to the detailed description of a preferred embodiment and to the annexed drawings, in which:

FIG. 1 is an elevation view of a preferred embodiment of a hydrostatic level instrument;

FIG. 2 is sectional view through the reservoir as seen on the line 2—2 of FIG. 1 looking in the direction of the arrows;

DESCRIPTION OF A PREFERRED EMBODIMENT

Figure 3:
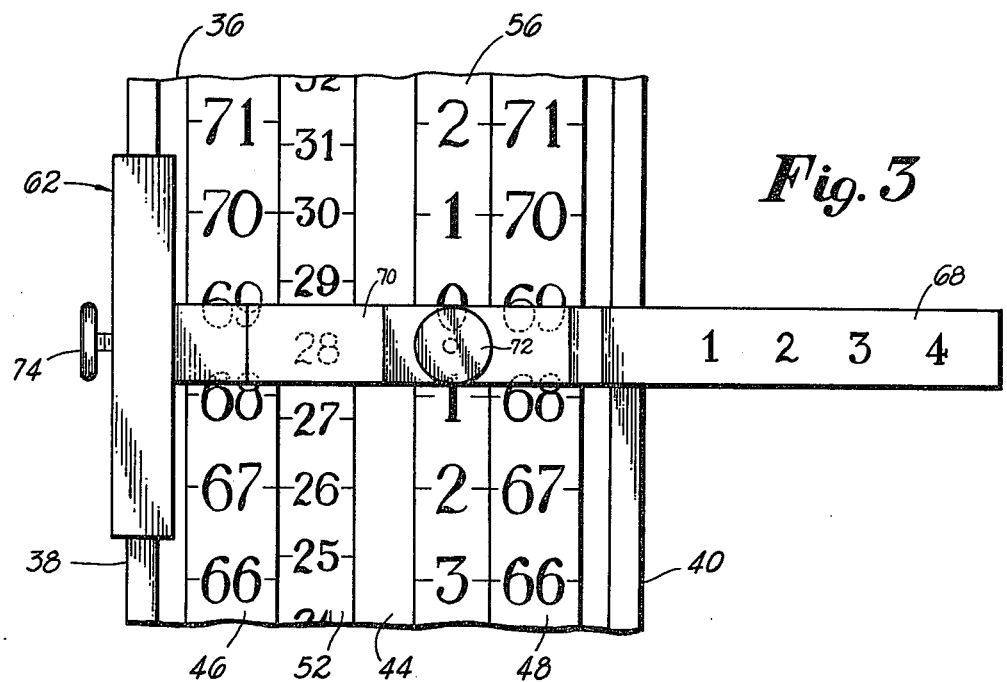
FIG. 3 is an enlarged detail of the guide on the level rod shown in FIG. 1, illustrating the relationship of the guide and the scales carried by the rod.

Referring to the annexed drawings illustrating a preferred embodiment of the invention, and particularly to FIG. 1, the numeral 10 designates a hydrostatic level instrument in its entirety, comprising two basic elements, namely, a liquid reservoir 12 and a level 14.

The liquid reservoir 12 includes an elongated container 16 having at least one wall thereof transparent. As used throughout this specification and claims, the term "transparent" connotes a wall through which light can traverse, which may be either clear, or which may be partly clear or translucent. The transparent wall may be made from glass or plastic material, or any other suitable material having the above characteristics. As illustrated in FIG. 1, the container 16 is circular and uniform in cross section for most of its length, being made entirely of transparent material. It is evident that the cross section may be other than circular, but it must be of uniform cross section throughout most of the length of the container.

The side wall of the container 16 carries a graduated scale 18 having uniform spacings or divisions related to the spacings or divisions on a movable tape carried by the level 14 as will be described fully hereinafter.

The container 16 is mounted on a supporting means consisting of a pair of brackets 22 and 24 attached to the container, the brackets having openings 26 through which an elongated pole 28 extends. The end of the pole is pointed at 30 permitting the pole to be driven into the ground for support. The container is vertically slidable on the pole, and one of the brackets includes a set screw 32 which can be tightened to retain the container in any adjusted position on the pole.

The upper end of the container 16 is equipped with a valve 20, permitting the filling and discharge of liquid from the container. Any liquid can be used, but it is preferred to employ a colored liquid having a low freezing point.

The level 14 comprises an elongated rod 34 generally in the form of an I in cross section, having a wide web 36 and a pair of end flanges 38 and 40. The outer surface of the flange 40 is grooved along its length to accommodate a permanent magnet 42 to enable the level to be supported by steel structures in an obvious manner. In operation, the lower end of the rod is adapted to rest on the ground as shown in FIG. 1.

Figure 4:
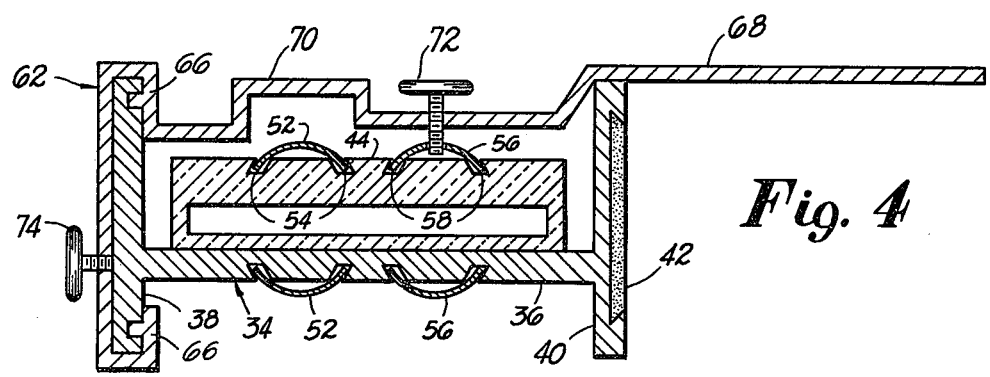
FIG. 4 is a sectional view through the level as seen on the line 4—4 of FIG. 1, looking in the direction of the arrows.
Figure 5:
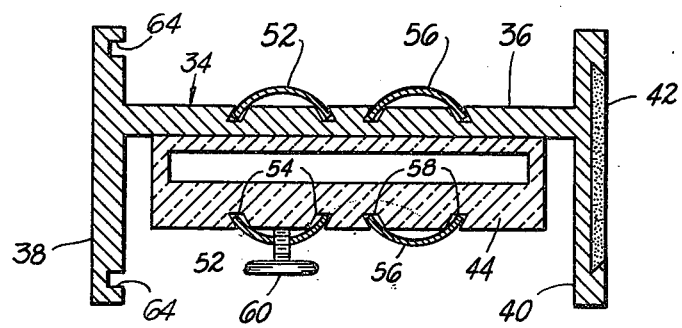
FIG. 5 is a sectional view through the level as seen on the line 5—5 of FIG. 1, looking in the direction of the arrows.

An elongated hollow tube 44 is attached to the web 36 within the confines of the flanges 38 and 40, the tube extending substantially the entire length of the rod 34. The tube is made from a transparent or translucent material, such as glass or plastic, and contains the same liquid as the reservoir 12. The tube 44 is flat in transverse cross section, and rectangular as shown, extending across the major part of the width of the web 36 as shown in FIGS. 4 and 5. The opposite sides of the tube are substantially parallel, and are contiguous. This construction provides a narrow liquid passage having a large surface areas allowing an easy reading of the liquid level in the tube. The exposed, outer, surface carries a pair of scales 46 and 48, in inches or centimeters, indicating distances from the bottom of the rod resting on the ground. While these scales are placed on the surface of the tube 44 as shown in FIG. 3, it is obvious that they could be placed on the web 36 between the tube and the flanges merely by designing the tube narrower. The upper end of the tube is equipped with a valve 50 permitting the admission of and the discharge of liquid into and from the hollow interior of the tube.

Mounted for longitudinal movement over the face of the tube 44 are a first elongated endless tape 52 guided in a pair of parallel slots 54 in the face of the tube and extending the length of the tube, and a second elongated endless tape 56 guided for movement in a second pair or parallel slots 58. The tapes are arcuate in cross section so that the edges thereof enter and ride in the slots 54 and 58. The endless tapes 52 and 56 pass over rollers, not shown, rotatably mounted on the upper and lower ends of the elongated rod 34, and are guided in slots on the rear face of the web 36 as shown in FIGS. 4 and 5.

A screw 60 passes through a threaded hole in the tape 52 at any convenient position along the tape, the screw having a large head to enable an operator to turn the screw and to raise or lower the tape as desired. By turning the screw slightly so that the end engages the upper surface of the tube 44, it is possible to create sufficient friction to prevent the tape from accidental movement during operation.

The tape 52 carries a scale having numerals increasing above and below a zero reading thereon. The spacing of the divisions on this scale is related to those on the reservoir in a ratio to be explained more fully hereinafter.

The tape 56 carries a scale having the same divisions as the scales 46 and 48, in inches or centimeters.

A guide 62 is mounted for longitudinal movement on the flange 38, the inner part of the latter including a track 64 comprising a pair of longitudinally extending slots, one above and one below the web 36, adapted to be engaged by a track engaging means 66, constituting a guide mounting means carried by the guide. An arm 68, attached at one end to the track engaging means 66, extends transversely across and beyond the rod 34, serving as an indicating device, and has a scale thereon to indicate distances from the outer wall of the flange 40. The arm 68 includes an elevated portion 70 to enable the guide 62, when raised or lowered, to pass over the screw 60. A set screw 74, carried by the track engaging means 66, permits the guide to be locked at any adjusted position.

A set screw 72, having an enlarged head, passes through a threaded bore in the arm 68, and the end thereof is adapted to engage a bore in the endless tape 56, the latter bore being so located in the tape 56 as to align the upper edge of the arm with the zero mark on the tape 56.

An elongated flexible duct 76 interconnects the lower ends of the reservoir 12 and the tube 44, permitting the reservoir 12 and the level 14 to be mounted at spaced locations. The upper ends of the reservoir and the tube may have restricted openings whereby the pressures on the upper surfaces of the liquid columns therein are equalized.

The cross sectional area of the container 16 is considerably larger than that of the tube 44, and their ratio should be an integer greater than 1. Consequently, the change in liquid levels would vary inversely with their ratio in cross sectional areas. As an example, if the cross sectional area of the container 16 were 3 times the cross sectional area of the tube 44, it is evident that if the operator raised or elevated the level 14 a distance of 4 inches, causing some of the fluid from the tube 44 to pass through the duct 76 into the container 16, the liquid level within the container will be raised one inch, while the level of the liquid in the tube will be lowered 3 inches, the liquid levels in the container and the tube being the same. The spacing of the divisions above and below the zero mark on the wall of the container 16 is ¼ inch apart, and the spacing of the divisions above and below the zero mark on the movable tape 52 is ¾ inches apart.

In operation, let us assume that we wish to use a reference mark on a column in a building construction as a desired level and that we wish to mark a number of other columns at different locations at the same level, and that the surface of the ground below the columns is at different levels. The reservoir is disposed at a suitable spot from which all the measurements can be made within the limits of the duct 76, and held in a vertical position either by driving the pole 28 into the ground, or by suspending the reservoir from any suitable support. The level is placed with its bottom on the ground abutting the column having the reference mark, and the distance from the ground is noted by moving the guide 62 until the top of the arm 68 is aligned with the mark. The screw 72 previously had been inserted in the bore in the endless tape 56, whereby the zero mark on said tape follows the movement of the arm. The container 16 and the endless tape 52 are adjusted vertically until the liquid level stands at zero on both of the scales thereon.

Let us assume further that the reference mark stands at 69 inches above the surface of the ground, indicated by a reading of 69 on the scales 46 and 48. The set screw 74 is tightened to retain the guide 62 in this position on the rod.

The level is then taken to the next column to be marked, and set on the ground beside the column in a position in which the arm 68 extends over the column, and a reading is taken on the scale 52. If we assume that the elevation of this new position is 5 inches lower than the previous reading at the reference position, there will be a reading of plus 5 on the scale 52. The screw 72 is turned so that it no longer engages the bore in the tape 56, and the set screw 74 of the guide 62 is loosened. The guide is raised until the top of the arm 68 is aligned with the numeral plus 5 on the tape 56. The top of the arm 68 is then at the same level as the reference level, and a suitable mark can then by made on the column. The same procedure is repeated at the remaining columns, and by noting the reading on the scale 52 at each location, the guide 62 and the arm 68 thereon may be moved accordingly, either up or down, to indicate the desired level on the column.

It is evident, from the foregoing, that the invention comprehends a novel hydrostatic level instrument in which all of the operational steps can be performed by one person, and that there is no problem of avoiding obstructions in the line of sight between the sighting tube and the target as in the case of the conventional level.

While only a single preferred embodiment of the invention has been illustrated and described, it is to be understood that the invention is not limited thereby, but is susceptible to change in form and detail within the scope of the subjoined claims.

I claim:

1. A hydrostatic level instrument, comprising: a liquid containing reservoir having a transparent side wall, said reservoir being generally elongated and having a uniform internal cross section, said side wall having a fixed graduated scale including uniformly spaced indicia increasing above and below a zero mark; a level including an elongated rod including a web and a pair of spaced flanges, one on each of the ends of said web, and being generally in the form of an "I" in cross section; said rod having at least one fixed scale including indicia directly measuring distances above a zero point at the bottom thereof; a transparent tube mounted on the web within the space between said flanges, said tube being flat and rectangular in transverse cross section with the sides thereof in contiguous relation with each other, said tube extending across the major width of said web; and a pair of movable tapes mounted for longitudinal movement, at least one of said tapes being movable over the face of said tube, each of said tapes having a scale including indicia increasing above and below a zero indicia thereon, said movable tapes being endless and mounted for movement within said flanges with the loops of the tapes passing over both sides of said web; a guide, means mounting said guide for longitudinal movement along said rod; and a flexible duct interconnecting the lower ends of said reservoir and said transparent tube.

2. A hydrostatic level instrument as defined in claim 1, in which said means mounting said guide for longitudinal movement includes a track on an inner surface of one of said flanges, said track including a pair of longitudinally extending slots, one above and one below the web.

3. A hydrostatic level instrument as defined in claim 2 in which said guide includes means engaging said track and an arm extending transversely of said rod and beyond the other flange.

4. A hydrostatic level instrument as defined in claim 2 in which said arm carries means adapted to selectively engage one of said tapes, whereby said guide may be moved with said tape, said guide moving independently of said other tape.

* * * * *